United States Patent [19]

Matsubara et al.

[11] Patent Number: 4,460,278
[45] Date of Patent: Jul. 17, 1984

[54] CONTINUOUS BULK POLYMERIZATION REACTOR

[75] Inventors: Tetsuyuki Matsubara; Norifumi Ito; Yuzuru Ishida; Mune Iwamoto, all of Yokohama; Tetsuo Maeda, Yachiyo, all of Japan

[73] Assignees: Toyo Engineering Corporation; Mitsui Toatsu Chemicals, Incorporated, both of Tokyo, Japan

[21] Appl. No.: 337,765

[22] Filed: Jan. 7, 1982

[30] Foreign Application Priority Data

Jan. 28, 1981 [JP] Japan .................................. 56-10162

[51] Int. Cl.$^3$ ............................................. B01F 15/06
[52] U.S. Cl. .................................... 366/149; 366/293; 366/310; 366/320; 366/330
[58] Field of Search ............... 366/144, 145, 146, 148, 366/149, 292, 293, 295, 310, 303, 304, 305, 307, 320, 325, 329, 330, 339; 422/135, 137, 202; 159/25 R, 25 A

[56] References Cited

U.S. PATENT DOCUMENTS 2,939,770 6/1960 Schwartzkopff ............... 366/149 X
4,013,273 3/1977 Danyliw ......................... 366/330 X Primary Examiner—Timothy F. Simone
Attorney, Agent, or Firm—Fisher, Christen & Sabol

[57] ABSTRACT

Disclosed is a continuous bulk polymerization reactor comprising a cylindrical reaction vessel elongated in the direction of the reacting fluid and a shaft installed within the reaction vessel. A plurality of flow of double helical-ribbon agitators are attached to the shaft in such a way that they face in the same direction, and a plurality of baffles having a relative open area of 5 to 40% based on the cross-sectional area of the internal space of the reaction vessel, are disposed between any adjacent ones of the agitators. Thus the formation of stagnant fluid pockets is avoided and excellent piston flow properties are achieved.

7 Claims, 4 Drawing Figures

FIG.1
FIG.4
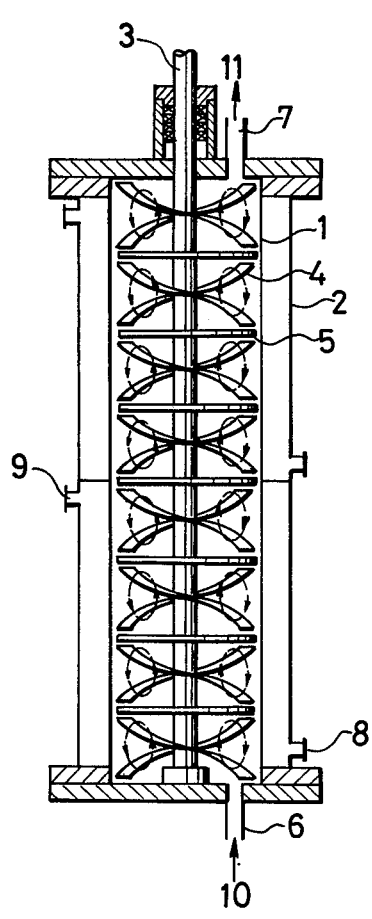
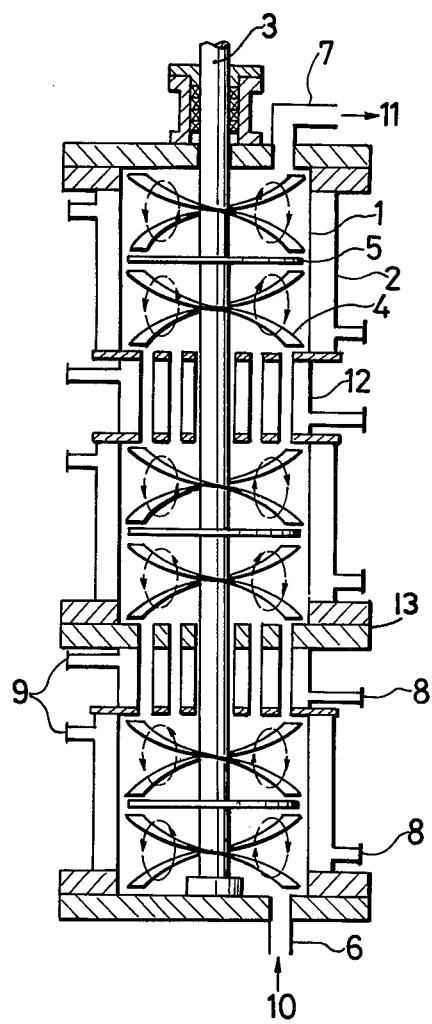

CONTINUOUS BULK POLYMERIZATION REACTOR

BACKGROUND OF THE INVENTION

1. Field of the Invention

This invention relates to improvements in continuous bulk polymerization reactors of cylindrical form suitable for use in the polymerization of such monomers as alkenyl aromatic compounds and the like.

2. Description of the Prior Art

Well-known processes for the production of polymers include emulsion polymerization, suspension polymerization, solution polymerization and bulk polymerization. Since these processes yield polymers having more or less different properties, they are selectively employed according to the type of the desired polymer. It may be pointed out that continuous bulk polymerization is preferred from the viewpoint of process operation because this process affords savings of resources and energy and enables the problem of environmental pollution to be solved by the adoption of a closed system. In the existing circumstances, however, continuous bulk polymerization involves many problems to be solved. They include, for example, the instability of the polymerization system, the viscosity increasing with the progress of polymerization, and the heat transfer area decreasing relative to the reaction volume as the scale of production is enlarged.

It is generally known that, in bulk polymerization, the viscosity of the reacting fluid increases exponentially as the reaction proceeds. In such a case, the formation of so-called stagnant fluid pockets (i.e., those portions of the reacting fluid which remain motionless) tends to occur in certain regions of the reaction vessel. Since these stagnant fluid pockets stay long at elevated temperature, the polymer arising therefrom is liable to degradation or gelation. Thus, the incorporation of this abnormal polymer significantly impairs the quality of the final product.

In order to avoid the formation of such stagnant fluid pockets, a number of methods have been proposed in the prior art. By way of example, one method comprises stopping the polymerization before the final degree of polymerization and hence the viscosity of the reacting fluid becomes high, another comprises adding a certain amount of solvent to the reacting fluid. According to these methods, the reacting fluid to be handled has such a low viscosity that stagnant fluid pockets are seldom formed. However, these methods are disadvantageous in that the operating efficiency of the equipment is reduced.

Still another method involves the use of screw agitators or other means which can apply a shear to the reacting fluid and thereby maximize its shear rate, for example, in the neighborhood of the wall surfaces of the reaction vessel. However, this method has the disadvantages of requiring a considerable amount of power consumption and of overheating the contents of the reaction vessel owing to the heat of agitation. Moreover, in the case of certain polymers, the application of a strong shear may impair the physical properties of the resulting product.

Generally, chemical reactors suitable for use in continuous polymerization include complete-mixing tank reactors that are differential reactors and tubular or tower reactors that are integral reactors. Where continuous bulk polymerization is carried out with a complete-mixing tank reactor, it is necessary to stir the highly viscous reacting fluid vigorously and thereby establish a uniform composition within the reaction vessel. Accordingly, as described above, an increase in power consumption is caused and the reacting fluid is subject to a shear. Moreover, the reacting fluid within the reaction vessel exhibits a wide residence time distribution. On the other hand, where continuous bulk polymerization is carried out with a tubular or tower reactor, the composition need not be uniform throughout the entire reaction vessel and the reacting fluid need not be stirred so vigorously, provided that a suitable measure is taken to avoid the formation of stagnant fluid pockets. Moreover, the reacting fluid within the reaction vessel can have a flow pattern showing a very limited residence time distribution and hence approaching piston flow. It may safely be said, therefore, that such a tubular or tower reactor is suitable for use in continuous bulk polymerization.

Tubular or tower reactors heretofore in use involve several problems such as the presence of stagnant fluid pockets, poor piston flow properties, difficulties in construction, and the like. In the tower reactor described in German Pat. No. 2705556, the presence of stagnant fluid pockets and the difficulties in construction have been overcome, but the problems of poor piston flow properties and a relatively wide residence time distribution remain unsolved.

In view of these circumstances, it is desirable to have a tower reactor suitable for use in continuous bulk polymerization which forms no stagnant fluid pockets, gives a limited residence time distribution, and can be constructed without any difficulty.

SUMMARY OF THE INVENTION

It is an object of the present invention to provide a continuous bulk polymerization reactor suitable for the polymerization of such monomers as alkenyl aromatic compounds and the like.

It is another object of the present invention to provide a continuous bulk polymerization reactor in which no stagnant fluid pockets are formed and excellent piston flow properties are achieved.

It is still another object of the present invention to provide a continuous bulk polymerization reactor which can be easily constructed of equipment components in common use.

The above objects of the present invention are accomplished by providing a continuous bulk polymerization reactor comprising a cylindrical reaction vessel provided with a fluid inlet and a fluid outlet, and elongated in the flow direction of the reacting fluid; a shaft installed within said reaction vessel; a plurality of double helical-ribbon agitators attached to said shaft in such a way that the greater part of said double helical-ribbon agitators face in the same direction; and baffles disposed between any adjacent ones of said double helical-ribbon agitator, said baffles having a relative open area of 5 to 40% based on the cross-sectional area of the internal space of said reaction vessel.

In a preferred embodiment of the present invention, the double helical-ribbon agitators are designed in such a way that the ratio of the ribbon width (b) of the agitators to the internal diameter (D) of the reaction vessel satisfies the condition $$0.05 \leq b/D \leq 0.3,$$

the clearance (δ) between the inner wall of the reaction vessel and the outer periphery of the agitators satisfies the condition $$1 \text{ mm} < \delta < 30 \text{ mm},$$

and the ratio of the axial length (h) of each agitator to the axial length (L) of the compartment containing it satisfies the condition $$h/L \geq 0.5.$$

BRIEF DESCRIPTION OF THE DRAWINGS

FIG. 1 is a sectional view of a continuous bulk polymerization reactor embodying the present invention.

FIG. 4 is a sectional view of another continuous bulk polymerization reactor embodying the present invention.

DETAILED DESCRIPTION OF THE INVENTION

The monomers which can be subjected to bulk polymerization with the continuous bulk polymerization reactor of the present invention are alkenyl aromatic compounds including styrene; α-methylstyrene; alkylstyrenes having the alkyl substituent on the benzene ring, such as o-methylstyrene, m-methylstyrene, p-methylstyrene, o-ethylvinylbenzene, m-ethylvinylbenzene, p-ethylvinylbenzene, etc.; halostyrenes having the halogen substituent on the benzene ring, such as o-chlorostyrene, m-chlorostyrene, p-chlorostyrene, o-bromostyrene, m-bromostyrene, p-bromostyrene, etc.; and the like. As monomers, these alkenyl aromatic compounds may be used alone or in combination. Moreover, one or more copolymerizable monomers such as acrylonitrile, methacrylic esters and the like can be added to the above alkenyl aromatic monomers. Furthermore, solutions of rubber-like polymers in one or more monomers as described above can also be used. Specific examples of such rubber-like polymers include polybutadiene, copolymers of butadiene and other copolymerizable monomers (such as styrene, acrylonitrile, methyl methacrylate, etc.), natural rubber, polychloroprene, ethylene-propylene copolymer, ethylenepropylene-diene copolymers, and the like.

In addition to the polymerization of the above-described monomers, the continuous bulk polymerization reactor of the present invention can also be used to carry out other types of addition polymerization and condensation polymerization (as in the case of nylons, polyesters and the like). It is to be understood that the term "bulk polymerization" as used herein comprehends not only bulk polymerization proper but also solution polymerization using a solvent in an amount of not greater than 30% by weight.

The polymerization can be initiated either by the application of heat or by means of a well-known initiator that releases free radicals when decomposed. Specific examples of such initiators include azo compounds such as azodiisobutyronitrile, etc. and peroxides such as benzoyl peroxide, etc.

Figure 2:
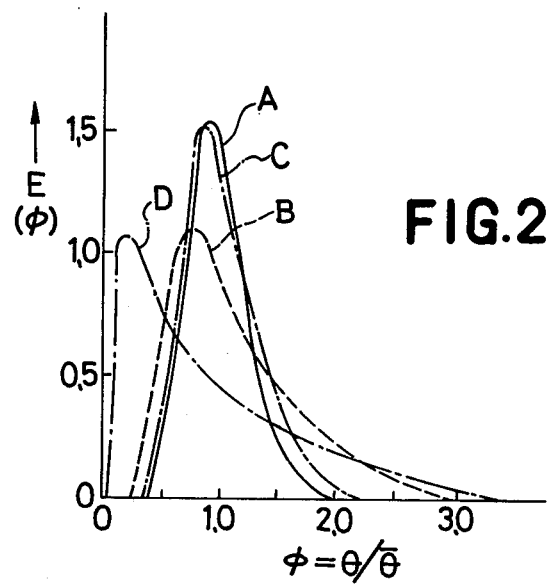
FIG. 2 is a graphical representation of residence time distributions measured under different conditions.
Figure 3:
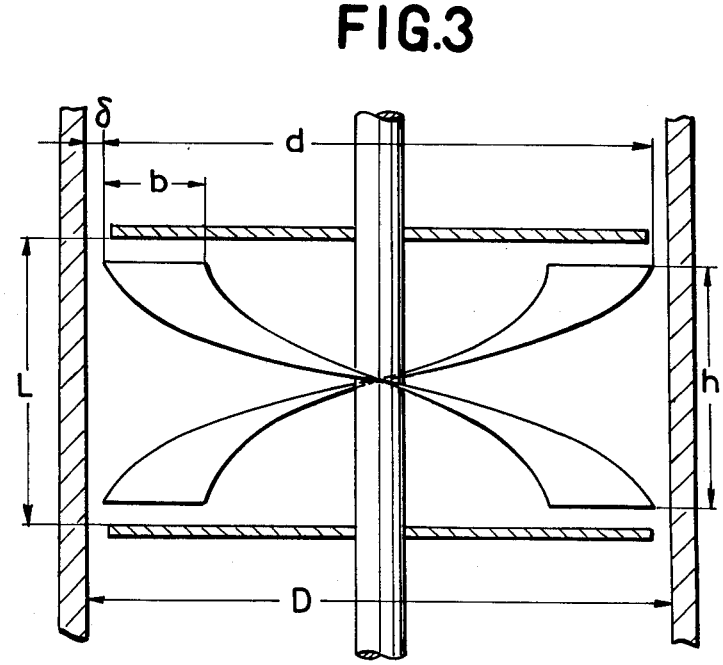
FIG. 3 is a schematic view of a double helical-ribbon agitator suitable for use in the continuous bulk polymerization reactor of the present invention.

An exemplary continuous bulk polymerization reactor embodying the present invention is illustrated in FIGS. 1 and 3, and the effects of the present invention are explained hereinbelow with reference to FIG. 2.

Referring first to FIG. 1, there is shown a cylindrical reaction vessel 1 which is elongated in the flow direction of the reacting fluid and provided with a jacket 2 so as to permit heating, temperature control or cooling as desired. This jacket may be either constituted of a single unit or divided into several sections. An inlet 8 and an outlet 9 enable a heat transfer medium to flow through jacket 2. Within reaction vessel 1, there is installed a shaft 3 to which a plurality of double helical-ribbon agitators 4 and baffles 5 are attached. These baffles serve to divide the internal space of the reaction vessel into a plurality of compartments or cells containing one agitator each. A feed stream is introduced through a fluid inlet 6 in the direction of arrow 10 and withdrawn from a fluid outlet 7 in the direction of arrow 11.

The agitators within the respective cells are positioned in such a way that they face in the same direction, and rotation of them causes the reacting fluid to flow in the same manner within each cell. The arrows given in each cell represent a partial circulation flow of the reacting fluid. The agitators are preferably rotated so that, as illustrated in FIGS. 1 and 4, the reacting fluid flows along the inner wall of the reaction vessel in the direction opposite to the overall flow direction of the reacting fluid therewithin.

If the agitators are rotated so that the reacting fluid flows along the inner wall of the reaction vessel in the same direction as the overall flow direction of the reacting fluid therewithin, short-circuiting and bypassing of the reacting fluid tend to occur in spite of the presence of the baffles and result in poor piston flow properties.

In the reactor of the present invention, the agitators are preferably positioned in such a way that at least 80% of them face in the same direction, and more preferably in such a way that all of them face in the same direction. If the agitators are positioned in such a way that they alternately or randomly face in opposite directions, for example, as described in German Pat. No. 2705556, the reacting fluid is in some degree prevented from moving between the cells and establishing a uniform composition throughout the entire reaction vessel, but the residence time distribution becomes wide as compared with that obtainable with the reactor of the present invention. Accordingly, such arrangements cannot be employed for the purpose of accomplishing the objects of the present invention.

In order to examine the piston flow properties of the reacting fluid, the distribution of residence times was measured under different conditions with the reactor illustrated in FIG. 1. The results thus obtained are plotted in FIG. 2 where $\theta$ is time, $\bar{\theta}$ is the mean residence time, $\phi = \theta/\bar{\theta}$ is dimensionless time, and $E(\phi)$ is the residence time distribution function. In this figure, curve A represents the residence time distribution observed when the agitators were positioned in such a way that all of them faced in the same direction, and curve B represents the residence time distribution observed when the agitators were positioned in such a way that they alternately faced in opposite directions. In comparison with curve B, curve A shows a limited residence time distribution and hence an improvement in piston flow properties. Curve C, which is very similar to curve A, represents the residence time distribution observed when the agitators were positioned in such a way that a single agitator faced in the direction opposite to that of the seven others.

The agitators included in the reactor of the present invention preferably comprise double helical-ribbon agitators of any other type (e.g., the full-pitch type or the like) may be used. Alternatively, a combination of double helical-ribbon agitators and screw agitators or the like may also be used.

Referring now to FIG. 3, there is shown a schematic view of a double helical-ribbon agitator suitable for use in the continuous bulk polymerization reactor of the present invention. With respect to the ribbon width (b) of this double helical-ribbon agitator, the ratio of the ribbon width (b) to the internal diameter (D) of the reaction vessel should preferably satisfy the condition $$0.05 \leq b/D \leq 0.3.$$

If the b/D ratio is less than 0.05, the fluid delivery rate of the agitator is so low that the formation of stagnant fluid pockets tends to occur. If the b/D ratio is greater than 0.3, the fluid delivery rate of the agitator is so high that the reacting fluid moves more freely between the cells to give a wider residence time distribution, and the amount of power required to rotate the agitator is increased to an undue extent.

With respect to the external diameter (d) of the double helical-ribbon agitator, the clearance ($\delta = (D-d)/2$) between the inner wall of the reaction vessel and the outer periphery of the agitator should preferably satisfy the condition $$1 \text{ mm} < \delta < 30 \text{ mm}.$$

If the clearance is not greater than 1 mm, great difficulties may be encountered in constructing the reactor because of the possible contact of the agitator with the reaction vessel. If the clearance is not less than 30 mm, the formation of stagnant fluid pockets tends to occur in the neighborhood of the wall surfaces of the reaction vessel.

With respect to the axial length (h) of the double helical-ribbon agitator, the ratio of the axial length (h) of the agitator to the axial length (L) of the cell containing it should preferably satisfy the condition.

$$h/L \geq 0.5.$$

If the h/L ratio is less than 0.5, the spaces between the agitator and the baffles are so wide that the formation of stagnant fluid pockets tends to occur therein.

In the production of polymers with the reactor of the present invention, no particular limitation is placed on the rotational speed of the agitators. Insofar as the rotational speed is higher than 1 rpm, the formation of stagnant fluid pockets, for example, in the neighborhood of the wall surfaces of the reaction vessel can be effectively prevented. However, rotational speeds higher than 30 rpm are generally undesirable because the movement of the reacting fluid between the cells becomes too active to give a limited residence time distribution and the amount of power required for agitation is increased to an undue extent.

In the reactor of the present invention, the presence of the baffles having a partitioning effect and disposed between any adjacent agitators makes it possible to prevent the reacting fluid from moving freely between the cells and thereby to establish a flow pattern showing a limited residence time distribution and approaching piston flow. If the reaction vessel does not include any baffles having a partitioning effect, the flow of the reacting fluid passing through the reaction vessel is not confined within each cell. As a result, the composition becomes uniform throughout the entire reaction vessel to give a very wide residence time distribution. In FIG. 2, curve D represents the residence time distribution observed when, in the reactor of FIG. 1, the agitators were positioned in such a way that all of them faced in the same direction but all of the baffles were omitted. This curve shows a very wide residence time distribution approaching that obtained in a complete-mixing tank reactor.

The above-described baffles disposed between any adjacent agitators to bring about a partitioning effect should having a relative open area ranging from 5 to 40% and preferably from 7 to 30%. If the relative open area is less than 5%, the resulting polymer tends to accumulate on the baffles as the viscosity of the reacting fluid rises. If the relative open area is greater than 40%, the partitioning effect of the baffles is too insufficient to prevent the reacting fluid from moving freely between the cells.

The term "relative open area" as used herein means the sum of the area of the apertures formed in the baffle and the area of the annular space between the baffle and the inner wall of the reaction vessel, the sum being expressed in terms of percentage based on the cross-sectional area of the internal space of the reaction vessel as measured in a plane perpendicular to the longitudinal axis thereof. However, where a shell-and-tube heat exchanger is used as a baffle, this term means the sum of the area of the apertures formed in the baffle and the area of the annular space between the baffle and the shaft, the sum being expressed in terms of percentage based on the cross-sectional area of the internal space of the reaction vessel as measured in a plane perpendicular to the longitudinal axis thereof.

Perforated discs having the above-defined relative opening area and attached to the shaft for rotation therewith are suitable for use as baffles having a partitioning effect. However, the use of other structures for this purpose is not precluded. For example, shell-and-tube or other types of heat exchanges having the above-defined relative opening area can be used. So long as the relative opening area falls within the above-defined range, these heat exchangers serve not only to bring about a partitioning effect, but also to remove the large amount of heat generated by the polymerization of the monomer. This provides a means of solving the problem of heat removal which is incidental to a scale-up of the reactor.

Referring now to FIG. 4, there is illustrated another exemplary continuous bulk polymerization reactor in which both perforated discs attached to the shaft for rotation therewith and shell-and-tube heat exchangers are used as baffles having a partitioning effect. This reactor comprises a cylindrical reaction vessel 1 which is elongated in the flow direction of the reacting fluid and composed of two segments connected with the aid of flanges 13. In this reactor, rotating perforated discs 5 and shell-and-tube heat exchangers 12 are used as baffles having a partitioning effect. These shell-and-tube heat exchangers serve not only to bring about a partitioning effect but also to remove the heat of polymerization by passing a heat transfer medium from an inlet 8 to an outlet 9. Thus, in the reactor of the present invention, both jacket 2 and shell-and-tube heat exchangers 12 can be used for the purpose of removing the heat of polymerization. If the reactor is scaled up, jacket 2 alone may be inadequate for the purpose of removing the heat of polymerization. In such a case, the shortage of heat transfer area can be made up by regulating the size of shell-and-tube heat exchangers 12 properly.

When continuous polymerization is carried out with the continuous bulk polymerization reactor of the present invention, the reacting fluid should suitably have a viscosity ranging from 1 to 30,000 poises. If the reacting fluid has a viscosity lower than 1 poise, the reactor of the present invention need not be used. If the reacting fluid has a viscosity higher than 30,000 poises, a number of problems such as an increase in power requirements for agitation, the formation of stagnant fluid pockets, and the like cannot completely be solved by using the reactor of the present invention. Accordingly, some other measure must be taken in addition to the present invention.

As described above, the reactor of the present invention makes it possible for the first time to carry out continuous bulk polymerization without any formation of stagnant fluid pockets, with a small amount of power consumption, and with a very limited residence time distribution approaching that of piston flow. Moreover, the reactor of the present invention can be constructed with great ease in that double helical-ribbon agitators and other equipment components in common use for industrial purposes can be used directly.

In comparison with continuous bulk polymerization reactors of the complete-mixing tank type, the reactor of the present invention requires a lower rotational speed of the agitators and hence a smaller amount of power consumption. As a result, the reacting fluid can have a correspondingly higher viscosity, so that the amount of solvent used may be decreased or the final degree of polymerization may be elevated. Thus, the reactor of the present invention provides an efficient process for the production of polymers.

Furthermore, the reactor of the present invention may be used either in a horizontal position or in a vertical position. In addition, the reaction vessel may have a side feed opening formed therein for the purpose of introducing monomers, solvents or various additives continuously into the reaction vessel and mixing them with the reacting fluid.

As is evident from the above description, the present invention has great versatility. It is to be understood, therefore, that the present invention is not limited to the specific embodiments described herein but may be otherwise embodied within the scope of the appended claims.

The present invention is further illustrated by the following examples.

EXAMPLE 1

A commercially available polybutadiene (for example, Diene 55 manufactured and sold by Asahi Kasei Co.) was mixed with and dissolved in styrene to form a monomer composition consisting of 95% by weight of styrene and 5% by weight of polybutadiene. This monomer composition was subjected to preliminary polymerization at 135° C. by feeding it continuously at a rate of 3.0 liters/hr to a 3.0-liter complete-mixing tank reactor provided with a screw agitator and a draft tube. The reacting fluid withdrawn from this preliminary reactor was continuously fed to a series of three main reactors to effect further polymerization.

As illustrated in FIG. 1, each of the main reactors comprised a cylindrical reaction vessel 1. This reaction vessel had an internal diameter (D) of 10 cm and a length of 40 cm and was provided with a jacket 2, a fluid inlet 6 and a fluid outlet 7. Within this reaction vessel was centrally installed a shaft 3, to which a total of eight double helical-ribbon agitators 4 of the half-pitch type were attached. In addition, perforated discs 5 were disposed between any adjacent agitators and attached to the shaft for rotation therewith, so that the internal space of the reaction vessel was divided into eight cells. The agitators had a ribbon width (b) of 2 cm, an axial length (h) of 4 cm, and an external diameter (d) of 9.5 cm. The clearance ($\delta$) between the inner wall of the reaction vessel and the outer periphery of the agitators was 2.5 mm. Thus, these main reactors had a b/D ratio of 0.2 and an h/L ratio of 0.9. All of the agitators were positioned in such a way that they faced in the same direction, and rotated in such a manner as to cause the reacting fluid to flow in the manner illustrated in FIG. 1. The perforated discs had a diameter of 9.5 cm and a thickness of 2 mm and were formed with a total of 24 apertures of 4 mm diameter arranged radially along 8 radii. (Thus, they had a relative open area of 14%.)

The reacting fluid having undergone the aforesaid preliminary polymerization was continuously fed to a first main reactor, where it was polymerized while being heated at 130° C. by means of the jacket and agitated at a rotational speed of 10 rpm. Thereafter, the reacting fluid was fed to a second main reactor. At the fluid inlet of the second main reactor, a 2:1 mixture of ethylbenzene and white mineral oil was continuously introduced as a solvent and additive at a rate of 0.3 liter/hr and mixed with the reacting fluid. Within the second main reactor, the reacting fluid was polymerized while being heated at 135° C. by means of the jacket and agitated at a rotational speed of 10 rpm. Thereafter, the reacting fluid was continuously fed to a third main reactor, where it was polymerized to completion while being heated at 155° C. by means of the jacket and agitated at a rotational speed of 5 rpm.

For the product stream emerging from the third main reactor, the degree of conversion of the monomer was 86% by weight. Its temperature was 165° C.

After being continuously withdrawn from the third main reactor, the product stream was freed of the unreacted monomer and the solvent by conventional devolatilization procedure and then pelletized with an extruder to yield a high-impact polystyrene product.

The final product thus obtained had the following properties.

| | |
|---|---|
| Rubber content | 5.8% by weight |
| Intrinsic viscosity of soft phase (as measured in toluene at 30° C.) | 0.74 |
| Melt flow index at 190° C. (ASTM D-1238) | 0.91 g/10 min. |
| Notched Izod impact strength (ASTM D-256) | 9.5 kg/cm/cm |
| Tensile strength (ASTM D-638) | 240 kg/cm$^2$ |
| Tensile elongation (ASTM D-638) | 64% |

EXAMPLE 2

In this example, a series of three reactors including shell-and-tube heat exchangers as illustrated in FIG. 4 were used as main reactors. The procedure of Example 1 was repeated with the following exceptions.

(a) A 20-liter complete-mixing tank reactor was used for purposes of preliminary polymerization.

(b) A monomer composition having polybutadiene rubber dissolved therein was fed at a rate of 20 liters/hr.

(c) A heat transfer medium having a temperature of 120° C. was passed through the jacket and heat exchangers of the first main reactor. (The agitators were operated at a rotational speed of 10 rpm.)

(d) A heat transfer medium having a temperature of 130° C. was passed through the jacket and heat exchangers of the second main reactor. (The agitators were operated at a rotational speed of 10 rpm.)

(e) A heat transfer medium having a temperature of 150° C. was passed through the jacket and heat exchangers of the third main reactor. (The agitators were operated at a rotational speed of 5 rpm.)

(f) At the fluid inlet of the second main reactor, a 2:1 mixture of ethylbenzene and white mineral oil was introduced at a rate of 3.0 liters/hr.

As illustrated in FIG. 4, each of the main reactors comprised a cylindrical reaction vessel 1 consisting of two segments connected with each other and having an overall length of 80 cm and an internal cell diameter of 20 cm. Within this reaction vessel was centrally installed a shaft 3, to which a total of six double helical-ribbon agitators 4 of the half-pitch type were attached. The internal space of the reaction vessel was divided into six cells by three perforated discs 5 attached to the shaft for rotation therewith and two shell-and-tube heat exchangers 12. The agitators had a ribbon width (b) of 2 cm, an axial length (h) of 7 cm, and an external diameter (d) of 19.5 cm. The clearance ($\delta$) between the inner wall of the reaction vessel and the outer periphery of the agitators was 2.5 mm. Thus, these main reactors had a b/D ratio of 0.1 and an h/L ratio of 0.7. All of the agitators were positioned in such a way that they faced in the same direction, and rotated in such a direction as to cause the reacting fluid to flow in the manner illustrated in FIG. 4. The perforated discs had a diameter of 19.5 cm and a thickness of 2 mm and were formed with a total of 8 apertures of 1.4 cm diameter arranged in a regularly triangular configuration. (Thus, they had a relative open area of 14%.) The shell-and-tube heat exchangers included a total of 18 tubes having an internal diameter of 1.4 cm and a length of 10 cm and arranged in a regularly triangular configuration, as well as a central tube having an internal diameter of 4 cm and a length of 10 cm. (Thus, they had a relative open area of 11%.)

The final product obtained under the above-described conditions was substantially the same as that obtained in Example 1.

COMPARATIVE EXAMPLE 1

Continuous polymerization was carried out under the same conditions as described in Example 1, except that the perforated discs included in the main reactors were replaced by discs of 9.0 cm diameter having six apertures of 3 cm diameter formed therein (so as to give a relative open area of 73%).

As a result, the temperature distribution within the reaction vessel was disturbed, and the chemical structure and physical properties of the resin became unstable. The final product thus obtained was inferior to that obtained in Example 1.

COMPARATIVE EXAMPLE 2

Continuous polymerization was carried out under the same conditions as described in Example 1, except that the double helical-ribbon agitators included in the main reactors were replaced by a paddle agitator comprising four paddles 3 cm wide and 9.5 cm long.

As a result, regions having higher temperatures were formed within the reaction vessel. In other words, the so-called runaway of the reaction vessel occurred and interfered with the establishment of a stabilized operation.

What is claimed is:

1. A continuous bulk polymerization reactor comprising a cylindrical reaction vessel having a fluid inlet and a fluid outlet; and the reactor vessel being elongated in a flow direction of reacting fluid; a shaft installed within said reaction vessel; a plurality of double helical-ribbon agitators attached to said shaft; each of said double helical-ribbon agitators being formed of elongated material and having two free ends; each of said double helical-ribbon agitators being attached at a generally central location to said shaft; at least 80% of said double helical-ribbon agitators facing in the same helical direction about said shaft and advancing in a parallel direction to said shaft; each of said double helical-ribbon agitators being connected in pairs on said shaft spaced apart from one another by about 180 degrees; and baffles being disposed between adjacent pairs of said double helical-ribbon agitators, said baffles having a relative open area of 5 to 40% based on the cross-sectional area of the internal space of said reaction vessel whereby the reacting flow is directed from the tips of the helical-ribbon agitators along the inner wall of the reaction vessel in the direction opposite to the overall flow of the reacting fluid therein.

2. A continuous bulk polymerization reactor as claimed in claim 1 wherein the ratio of the ribbon width (b) of said double helical-ribbon agitators to the internal diameter (D) of said reaction vessel satisfies the condition $$0.05 \leq b/D \leq 0.3.$$

3. A continuous bulk polymerization reactor as claimed in claim 1 or 2 wherein the clearance ($\delta$) between the inner wall of said reaction vessel and the outer periphery of said double helical-ribbon agitators satisfies the condition $$1 \text{ mm} < \delta < 30 \text{ mm}.$$

4. A continuous bulk polymerization reactor as claimed in claim 1 wherein the ratio of the axial length (h) of each of said double helical-ribbon agitators to the axial length (L) of the compartment containing it satisfies the condition $$h/L > 0.5.$$

5. A continuous bulk polymerization reactor as claimed in claim 1 wherein at least one of said baffles comprises a shell-and-tube heat exchanger.

6. A continuous bulk polymerization reactor as claimed in claim 1 wherein all of said double helical-ribbon agitators face in the same direction.

7. A continuous bulk polymerization reactor as claimed in claim 1 wherein said baffles have a relative open area of 7 to 30% based on the cross-sectional area of the internal space of said reaction vessel.

* * * * *